United States Patent [19]
Gugler

[11] 3,859,018
[45] Jan. 7, 1975

[54] APPARATUS FOR MAKING COFFEE RINGS
[75] Inventor: Victor F. Gugler, Lyons, Colo.
[73] Assignee: Entenmann's Bakery, Inc., Bayshore, Long Island, N.Y.
[22] Filed: July 3, 1972
[21] Appl. No.: 268,711

[52] U.S. Cl............. 425/126 R, 425/319, 425/391, 426/275, 425/334, 425/439
[51] Int. Cl........................... A21c 3/08, A21c 9/04
[58] Field of Search........... 425/319, 320, 334, 391, 425/392, 393, 126

[56] References Cited
UNITED STATES PATENTS
| | | | |
|---|---|---|---|
| 2,584,514 | 2/1952 | Thompson et al. | 425/334 X |
| 2,591,546 | 4/1952 | Hettinger | 425/324 |
| 2,827,862 | 3/1958 | Genich | 425/334 |
| 3,792,954 | 2/1974 | Heyman | 425/319 X |

FOREIGN PATENTS OR APPLICATIONS
550,437  10/1956  Italy.................................. 425/319

Primary Examiner—Andrew R. Juhasz
Assistant Examiner—David S. Safran
Attorney, Agent, or Firm—Kenyon & Kenyon Reilly Carr & Chapin

[57] ABSTRACT

A method and apparatus for forming rings of dough entirely by machine to be baked into coffee rings by guiding lengths of twisted dough into rotating circular molds by use of a baffle assembly, flattening the dough rings to unite the ends of the ring together, and removing the dough rings from the circular mold by inverting the mold and moving a bottom portion of the mold with respect to the mold to discharge the dough ring.

18 Claims, 13 Drawing Figures

APPARATUS FOR MAKING COFFEE RINGS

BACKGROUND OF THE INVENTION

1. Field of the Invention

This invention relates to the baking art and, to mechanical, mass production methods for forming dough into rings to be later baked into coffee rings.

2. Description of the Prior Art

There are a number of known machines and methods for forming dough into various desired shapes for baking, none of which machines and methods disclose the same design nor provide the same advantages of the present invention. U.S. Pat. No. 2,591,546 to Hettinger discloses a machine for making coffee rings. This is clearly a different apparatus and method and does not provide the high-speed mass production advantages of the present invention.

U.S. Pat. No. 2,584,514 to Thompson discloses a machine for making bagels in which the dough rings are formed about a plunger 73. U.S. Pat. No. 3,433,188 to Thompson also discloses a machine for making bagels in which a folding action is used to form the rings and the rings are subsequently worked upon a mandrel.

U.S. Pat. Nos. 2,827,862 and 846,536 disclose the use of a continuous, endless chain conveyors for use in making other articles, candy canes and bricks.

SUMMARY OF THE INVENTION

The method and machine of this invention is designed to form dough into rings to be later baked into coffee rings. The method and machinery enables such dough rings to be formed automatically and mechanically in a mass production system, without the use of hand labor.

It is known in the art of mass-production baking, including the baking of coffee rings, to use a machine to make rolls of dough. The rolls of dough are then formed into coffee rings by hand because existing machines are unsatisfactory. The method and machinery of this invention is designed as a labor-saving device to enable such coffee rings to be formed by machinery instead of by hand, and thereby achieve economy and higher speed.

This invention is directed to the method and apparatus for receiving rolls of dough, the lengths of each roll being equal to the desired circumference of the coffee ring. Then, each roll of dough is guided by means of a baffle assembly into a different one of a plurality of circular molds. Each roll of dough is lowered into one of the circular molds while the mold is rotating, with the result that the dough is wound into a circular recess in the mold. Then, the dough in the form of a ring is compressed within the mold to unite the ends of the dough ring together. The dough ring is then removed from the mold by inverting the mold and moving the bottom portion of the circular recess with respect to the mold itself so as to push the dough ring out and deposit the dough ring on a tray for baking. Various ingredients, such as nuts or melted sugar, may be distributed on the surfaces of the coffee ring as desired.

Accordingly, it is an object of this invention to provide a method and apparatus for automatically and mechanically forming dough into a circular ring suitable for baking into coffee rings without the use of hand labor.

It is another object of this invention to provide a method and apparatus which will form such a dough ring suitable for baking into a coffee ring more efficiently, more economically and faster than the prior art methods of forming such dough rings by hand.

These and other objects and advantages will become apparent in the details of construction and operation as more fully described herein, in reference to which the accompanying drawings form a part, wherein like numerals refer to like parts throughout.

DESCRIPTION OF THE DRAWINGS

FIG. 9 is a vertical section view of the plurality of circular molds, shown in FIGS. 4, 5, 6, 7 and 8, and the associated apparatus for conveying the molds through various stages of operation within the machine.

DETAILED DESCRIPTION

Figure 1:
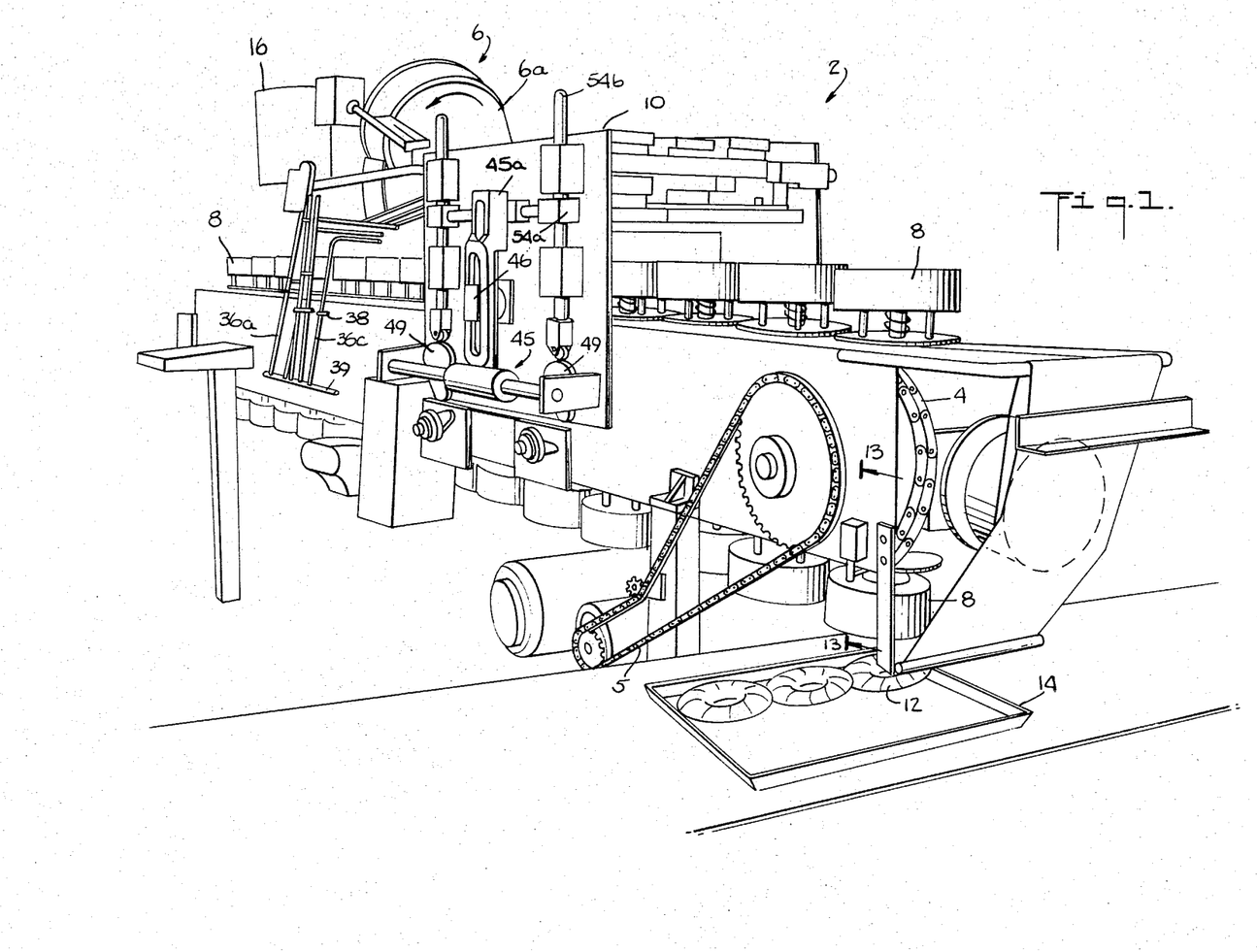
FIG. 1 is an isometric view of the entire machine of the invention showing the discharge end of the machine in the foreground and the input end of the machine in the background.

Referring to FIG. 1, the machine for making coffee rings, designated generally by the numeral 2, consists of a number of assemblies positioned along a conveyor system which moves on endless chains 4 driven by drive mechanism 5. The apparatus including cone 6 supplies twisted rolls of dough which are guided by the machine into circular molds 8 as the molds 8 advance along the top of the conveyor system, moving in a direction from the background of FIG. 1 toward the foreground of FIG. 1.

During the advance of the molds 8 along the top of the conveyor system, the molds 8 pass through a pressing assembly 10 which compresses each of the dough rings within the molds 8 to unite the ends of the dough ring together.

Figure 2:
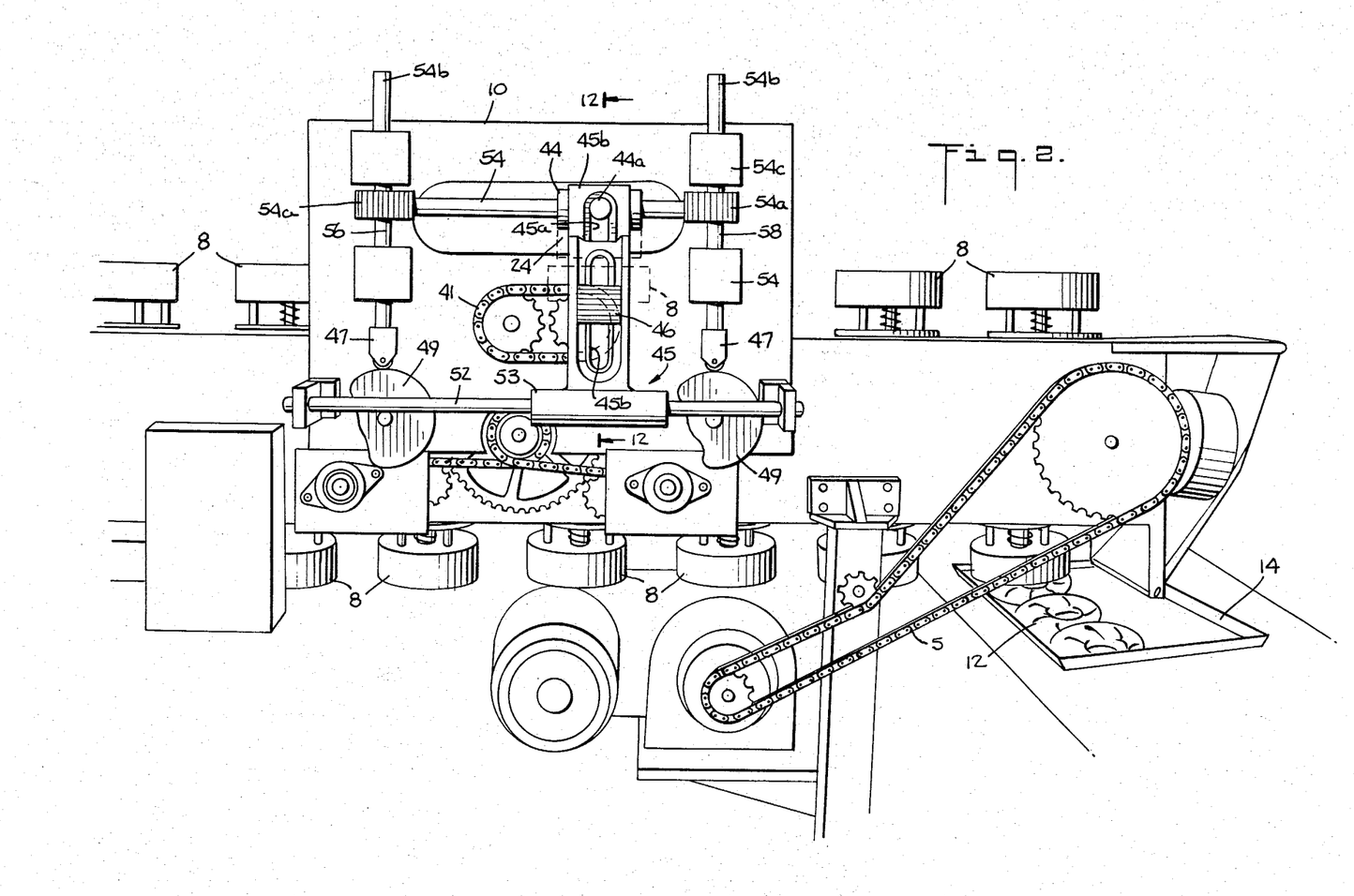
FIG. 2 is a side view of a portion of the machine shown in FIG. 1 and showing the discharge end of the machine.

When each of the circular molds 8 reaches the discharge end of the machine shown in the foreground of FIG. 1 and shown at the right side of FIG. 2, the molds 8 are inverted by the endless chains 4 and each of the dough rings 12 is removed from the molds 8 and placed on a baking pan 14. The molds 8 continue to move on the endless chains 4 and are returned to the input end of the machine 2 in the background of FIG. 1. After a suitable number of dough rings 12 have accumulated on a baking pan 14, the baking pan 14 is moved along a separate conveyor system, which is not a part of this invention, to ovens where the dough rings are baked and another empty baking pan 14 is advanced to the discharge end of the machine 2 in the foreground of FIG. 1.

Obviously, the size of the baking pans may vary and the number of dough rings to be placed on any one baking pan 14 may vary. In this embodiment, baking pans 14 of standard size, 17 inches by 26 inches, are used. Six dough rings are placed on each of such baking pans 14 in a pattern of two by three. This pattern can be adjusted by changing the conveyor system which is used for moving the baking pans 14.

FIG. 9 shows a typical mold 8 as the mold 8 moves through various stages of the machine. Beginning at the upper left corner of FIG. 9, a dispensing apparatus 16 containing topping material 18, such as nuts, deposits the topping material 18 into the mold 8a which is rotated as will subsequently be described. Most of the topping material 18 drops to the bottom of the mold 8a. The dispensing apparatus is actuated by rod 18a which is moved with a swinging motion each time follower 18b engages the side portion of a mold.

The mold 8 advances along the machine on the upper reaches of endless chains 4, moving from left to right as shown in FIG. 9. When the rotating mold 8b encounters brush 20, the brush 20 sweeps the top surfaces of the mold 8b and urges any topping material 18 which may have remained on the top surfaces into the mold.

The rotating mold 8 continues its movement along the upper reaches of the endless chains 4, moving from left to right, and next reaches the position of mold 8c in which a twisted roll of dough 22 is wound into the circular mold 8c, in a manner which will be explained in more detail subsequently.

Continuing its movement along the upper reaches of endless chains 4, the mold 8d (no longer rotating) encounters a pressing member 24 which fits into the mold and compresses the dough ring 12 therein, thus flattening the dough ring 12 and uniting one end of the dough ring 12 to the other end.

When the mold 8 reaches the position of the mold 8e at the discharge end of the machine 2, shown at the right of FIG. 9, it follows the endless chains 4 in a clockwise and downward movement to the position of mold 8f and then to the inverted position of mold 8g. When in position of mold 8g, the circular dough ring 12 is removed from the mold 8g and deposited on baking tray 14. Because of this discharge function, the end of the machine 2 shown on the right side of FIG. 9 is called the discharge end. Moving from the position of mold 8g, the mold 8 continues to ride on endless chains 4, riding now on the lower reaches of the chains with the mold 8 in an inverted position, and returns to the opposite end of the machine shown at the left of FIG. 9 and eventually reaches the position of mold 8a.

Summarizing the operation, illustrated in simplified form in FIG. 9, mold 8 moves on endless chains 4, in a clockwise direction as shown in FIG. 9, from the topping stage of mold 8a; to the brushing stage of mold 8b; to the dough delivery stage of mold 8c; to the pressing stage of mold 8d; to the discharge stage of mold 8g; and then returns to the position of mold 8a.

In sequence, each of the foregoing stages of operation will now be described in greater detail.

TOPPING STAGE

Referring to FIG. 9, topping material 18, such as nuts, is deposited in the bottom of mold 8a before the rolls of twisted dough 22 are wound into the molds. While the mold 8 is advanced along the upper reaches of endless chains 4 in the positions of mold 8c, 8d and 8e the topping material is positioned below the dough ring 12. When the dough rings 12 are compressed in mold 8d by the pressing member 24, the topping material within mold 8d is pressed into the dough ring 12. When the mold 8 advances to the position of mold 8g, the mold 8g has been inverted so that the topping material 18 is now on the top of dough ring 12.

Figure 10:
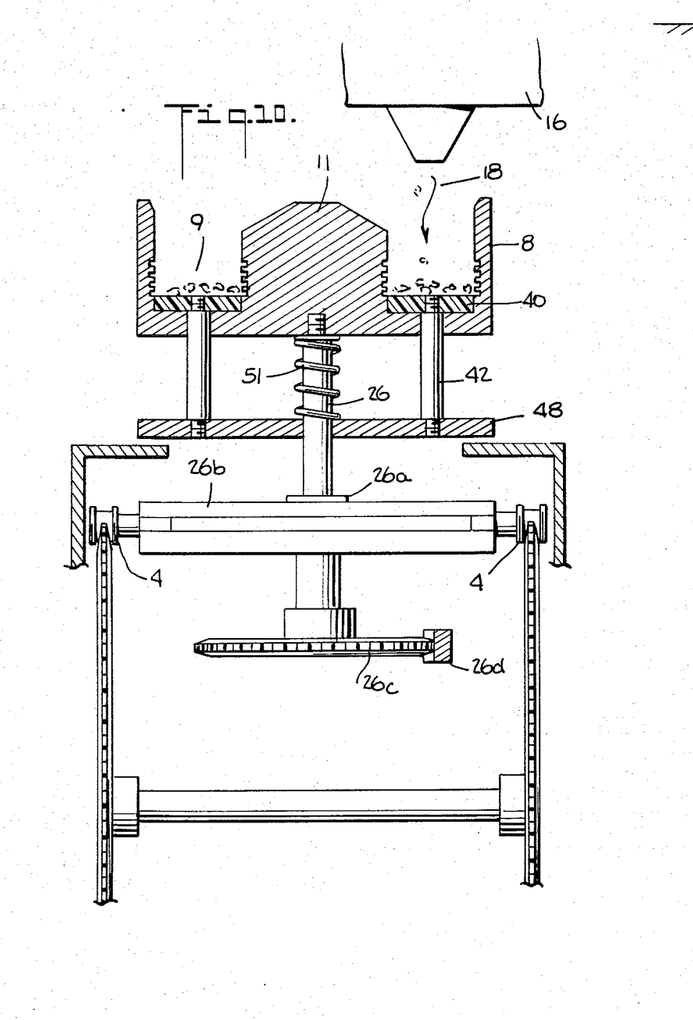
FIG. 10 is a vertical section view taken along the line 10–10 in FIG. 9 and showing a circular mold prior to receiving a roll of dough.

FIG. 10 shows an enlarged view of a circular mold 8 in the position of mold 8a of FIG. 9. Referring to FIG. 10, topping material 18 from dispensing device 16 is deposited in the mold 8 and most of the topping material 18 falls to the bottom of the mold 8. Mold 8 is circular in shape with an interior circular recess 9 extending about center hub 11. Mold 8 has a movable bottom 40, the function of which is explained in the subsequent description of the discharge stage.

Circular mold 8 is mounted upon vertical shaft 26 which is pivotally mounted by bearings 26a on support 26b attached to chains 4. On the end of shaft 26 opposite to that upon which mold 8 is mounted there is provided sprocket 26c which engages fixed chain 26d extending along the path of travel of chains 4. As shown in FIG. 9, fixed chain 26d extends from the topping station to beyond the dough delivery station but not to the pressing station. The engagement of the sprocket with the fixed chain causes the mold to rotate as the endless chains 4 advance the mold.

The rotary motion of the mold enables the topping material 18 to be distributed about the entire circumference of movable bottom 40 within the circular recess 9.

The topping stage is optional and may be omitted if plain coffee rings are desired. conversely, several different types of topping may be deposited in mold 8, either from a single reservoir 16 or from several reservoirs.

BRUSHING STAGE

Referring to FIG. 9, the function of the brushing stage is merely to remove from mold 8b any topping material which may have been left on the top surfaces of mold 8b. The brush 20 which sweeps the top surfaces of mold 8b is also shown in FIGS. 3 and 4.

DOUGH DELIVERY STAGE

Referring to FIG. 9, a roll of twisted dough 22 is wound into each of the molds 8 as each mold passes through the position of mold 8c. The twisted rolls of dough 22 are supplied from twisting apparatus 6 (shown in FIGS. 1 and 3) which is well known in the art. Cone 6a of the twisting apparatus rotates in the direction of the arrow in FIG. 1. The twisting apparatus is driven in synchronism with the drive to endless chains 4. Strips of dough are delivered to the twisting apparatus in synchronism with the advancement of the molds. A guillotine can be used to cut the strips of dough from a length of dough being advanced toward the twisting apparatus. Thus the twisting apparatus can receive a strip of dough, form it into a roll of twisted dough 22, and make the roll available for depositing into the next empty mold being advanced to adjacent the discharge portion of the twisting apparatus.

Figure 3:
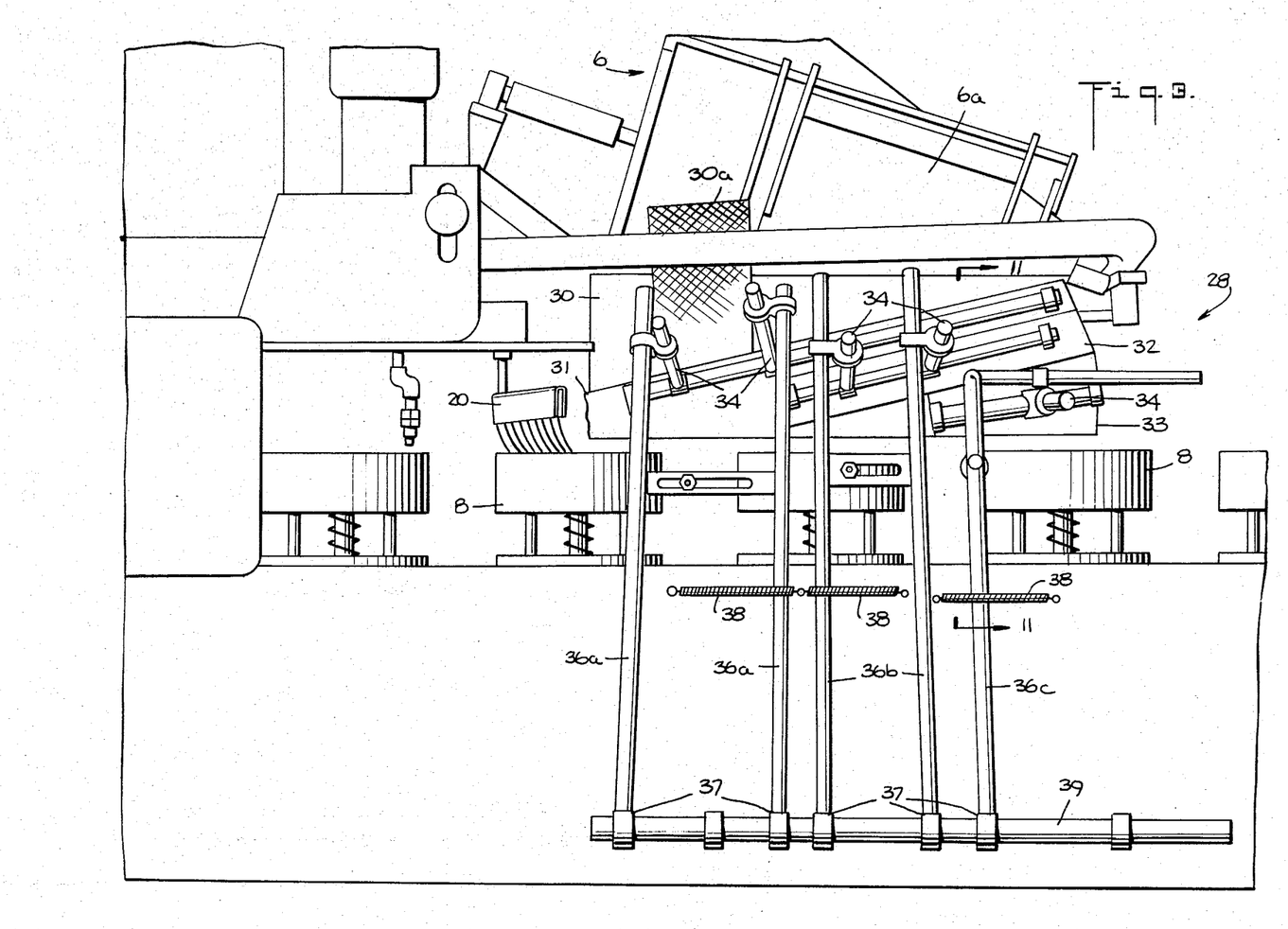
FIG. 3 is a side view of a portion of the machine shown in FIG. 1 showing the input end of the machine.
Figure 4:
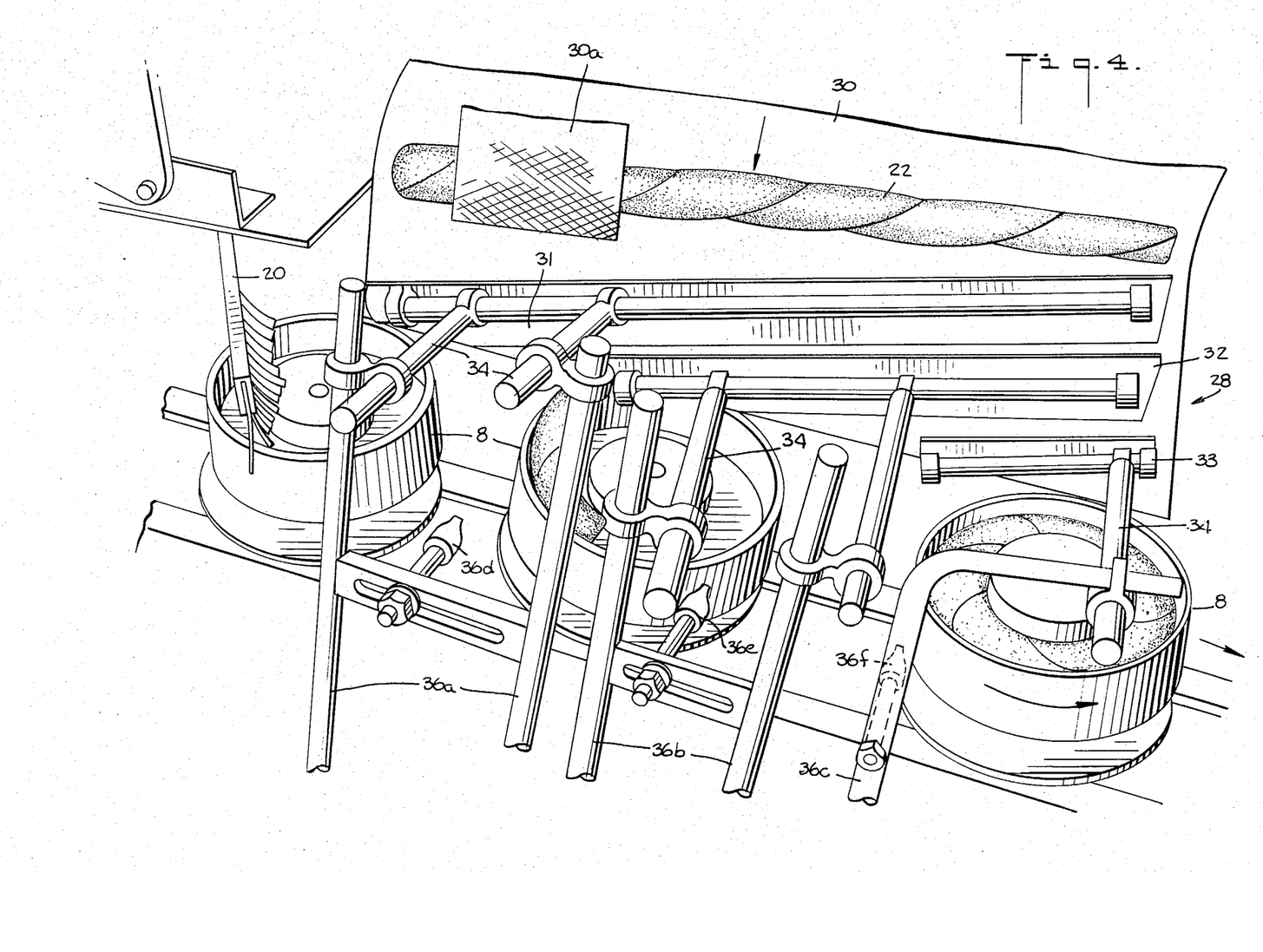
FIG. 4 is an enlarged isometric view showing the circular molds for receiving the rolls of dough.
Figure 11:
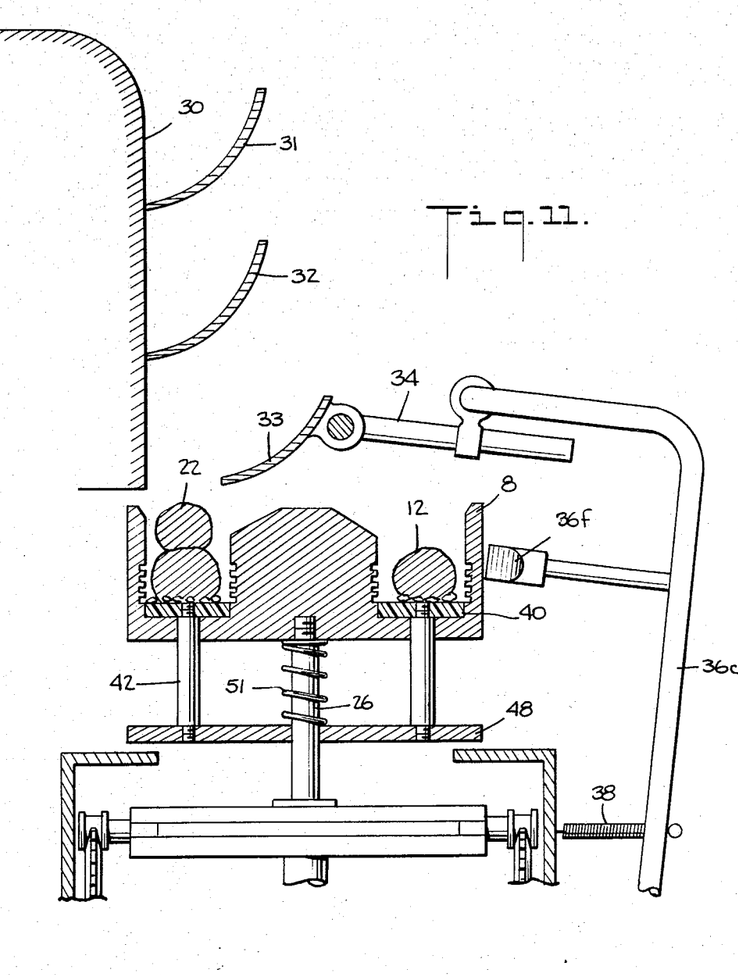
FIG. 11 is a vertical section view taken along the line 11—11 in FIG. 3 and showing a roll of dough disposed within a circular mold.

The rolls of twisted dough 22 are guided into each of the circular molds 8 by a baffle assembly shown in FIG. 3 and FIG. 4 and designated generally by the numeral 28. Referring to FIGS. 5, 6, 7, 8 and 11, the function of the baffle assembly is to lower a roll of twisted dough 22 into rotating mold 8. The mold 8 is in continuous rotation in the counterclockwise direction in this embodiment as indicated by the arrows. The rotation assists in the winding of the twisted roll of dough 22 into the interior recess of the mold 8. Referring to FIGS. 3, 4 and 11, the baffle assembly includes a fixed baffle 30 and three movable baffles 31, 32 and 33 which guide each length of twisted dough 22 as it is lowered along the side of fixed baffle 30. Twisting apparatus 6 delivers the rolls of twisted dough on to the upper portion of baffle 30. Mesh 30a holds the leading end portion 23 of the roll against baffle 30 as the same end of the roll descends toward baffle 31.

Referring to FIG. 3, the movable baffles 31, 32 and 33 are supported by a plurality of baffle arms 34 which, in turn, are supported by a plurality of actuating arms 36a, 36b and 36c, respectively, held against the side of the machine by biasing coil springs 38. The actuating arms 36 are connected by yokes 37 to support bar 39 which is affixed (as shown in FIG. 1) to the frame of the machine 2.

Figures 7, 8:
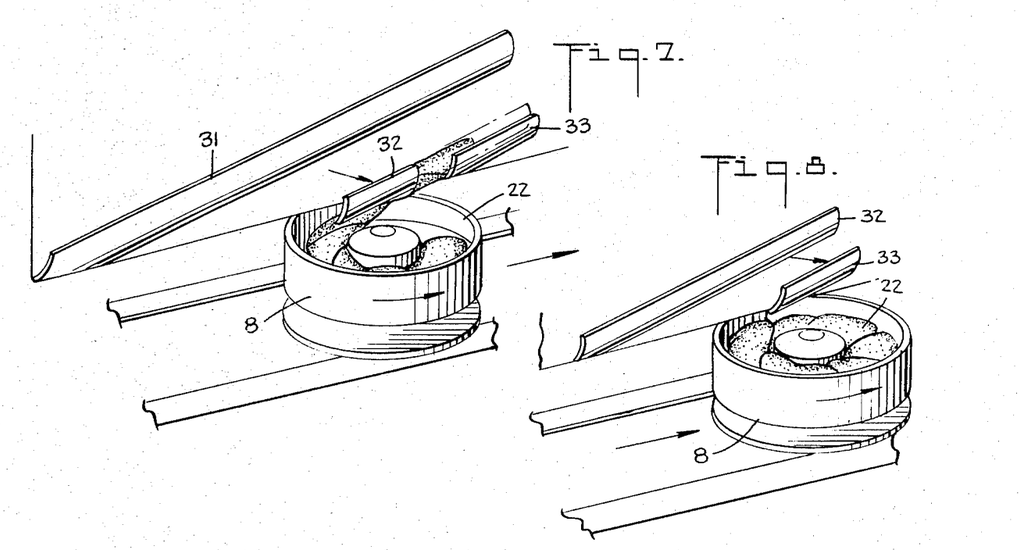
Figure 8:
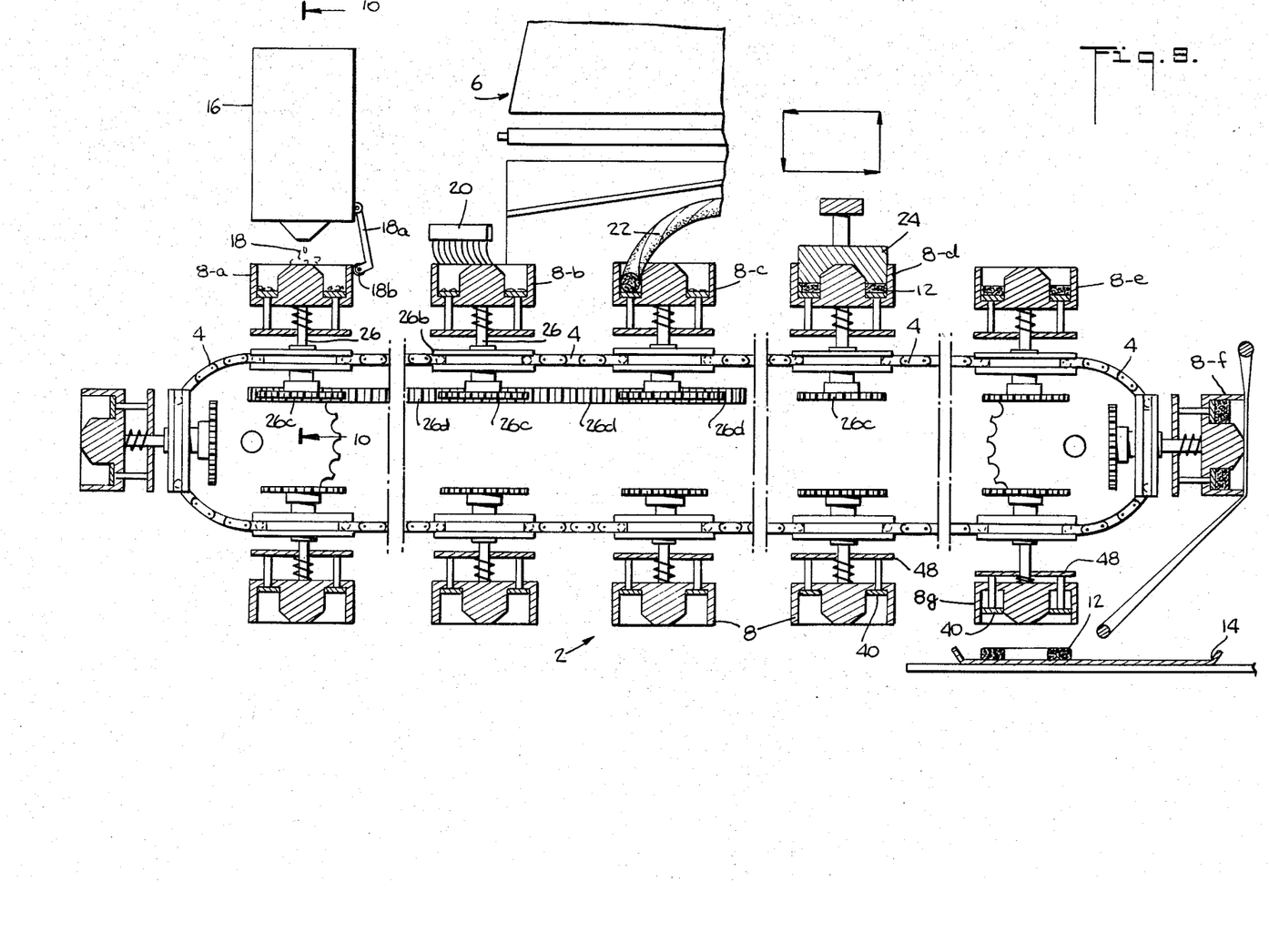

Referring to FIGS. 5, 6, 7, 8 and 11, the three movable baffles 31, 32 and 33 are of different lengths and are positioned at different heights. The first movable baffle 31 is the longest of the three movable baffles and is positioned higher than the other two movable baffles. The first movable baffle 31 is the first to engage the roll of twisted dough 22 and guide the leading end portion 23 as it is being lowered into the circular mold 8 shown in FIGS. 5 and 6. The engagement of follower 36d (FIG. 4) attached to arms 36a with the leading portion of the outer circumference of an advancing mold 8 causes the arms 36a to move progressively outwardly with respect to the machine, thereby progressively moving baffle 31 away from baffle 30 and releasing the roll of dough toward baffle 32. In sequence, the middle portion of the same roll of twisted dough 22 is engaged by the second movable baffle 32 which is somewhat shorter than the first movable baffle 31. The second movable baffle 32 is also positioned lower than the first movable baffle 31, as shown in FIG. 11. Follower 36e (FIG. 4) progressively moves baffle 32 away from baffle 30 thereby progressively lowering and releasing the roll of dough. Lastly, the trailing end portion of the same roll of twisted dough 22 is handled by the third movable baffle 33 which is the shortest of the three movable baffles and is positioned lower than the other two movable baffles, as shown in FIGS. 7, 8 amd 11. Baffle 33 is progressively moved by follower 36f.

In order to facilitate the delivery of each roll of twisted dough 22 into a circular mold 8, each of the movable baffles 31, 32 and 33 can be downwardly inclined with the lowest portion thereof being directed toward the entrance portion of the machine where the topping material is applied. The inclination of the movable baffles facilitates the directing of each roll of twisted dough into the mold. Furthermore the inclination of the baffles enables each roll of twisted dough to be supported substantially throughout the process of delivering the roll to the mold since the verticle spacing of the end portions of the baffles facing the entrance portion of the machine is minimized.

In operation the movement of the baffles in response to the engagement of the followers with the outer surface of the molds results in a coordinated and wave-like motion of the baffles which insures the smooth transfer of a given roll of twisted dough progressively from one baffle to the other as the roll is delivered to the mold. Consequently the possibility of distorting or severing a roll during delivery is minimized by the action of the baffles.

Figures 5, 6:
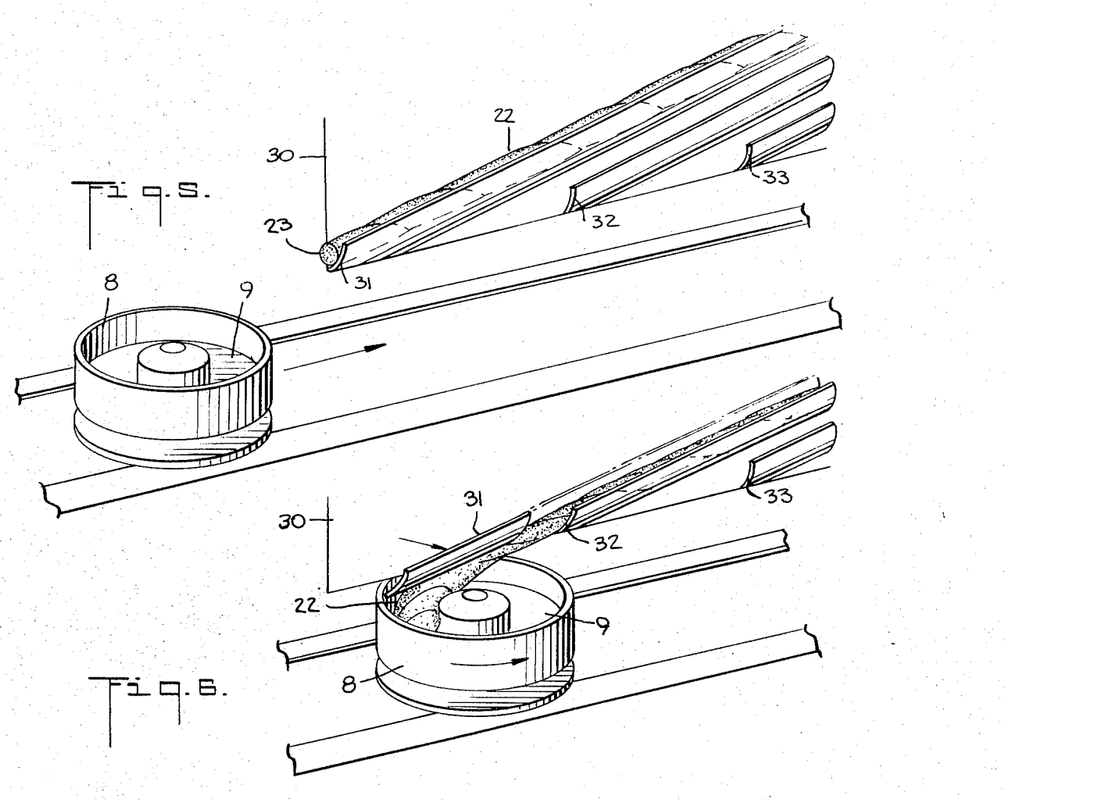
FIGS. 5, 6, 7 and 8 are isometric views showing, in sequence, a twisted roll of dough being guided into a rotating circular mold as it advances within the machine.

During the time interval when the roll of twisted dough 22 is being progressively lowered and disengaged by the three movable baffles, the circular mold 8 is continuing to experience two different types of motion. First, the mold 8 is being advanced in a linear direction along the endless chains 4, moving from left to right as shown in FIG. 5. Second, the mold 8 is also rotating, in a counterclockwise direction, as shown in FIGS. 6 and 7. The linear advance of the mold from left to right causes the mold to move past each of the movable baffles 31, 32 and 33 as the roll of twisted dough 22 is being lowered. In addition the rotation of the mold 8 causes the roll of twisted dough 22 to be wound inside the interior circular recess 9 of the mold 8 so that the roll of twisted dough 22 forms a ring within mold 8. The roll of twisted dough 22 slides down along the side of fixed baffle 30 and is thus supported between the fixed baffle 30 and each of the movable baffles 31, 32 and 33, as shown in FIGS. 5 and 6.

FIG. 5 shows mold 8 as it is about to reach a position beneath the lower end portion of the first movable baffle 31.

FIG. 6 shows mold 8 positioned beneath the first movable baffle 31 as the leading end 23 of the roll of twisted dough 22 enters the circular recess 9 of the mold 8 and begins to be wound in the form of a ring within the mold 8. In FIG. 6, baffle 31 has released the roll onto baffle 32.

FIG. 7 shows mold 8 having passed the first movable baffle 31 and being positioned under the second movable baffle 32 with approximately half the length of twisted dough 22 being wound within the circular recess of the mold 8. In FIG. 7 the roll is being released by baffle 32 onto baffle 33.

FIG. 8 shows the mold 8 having been advanced past the first and second movable baffles 31 and 32 and being positioned under the third movable baffle 33 which is completing the action of lowering the roll of twisted dough 22 into the mold 8 by releasing the trailing end portion of the roll.

PRESSING STAGE

Figure 12:
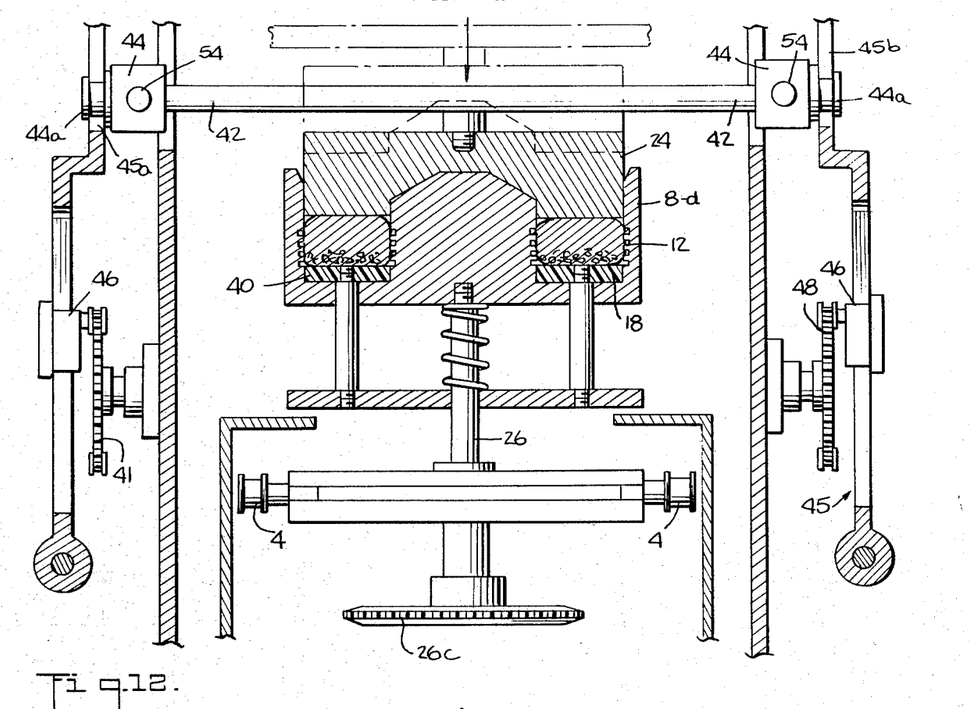
FIG. 12 is a vertical section view taken along the line 12—12 of FIG. 2 and showing a drive for rotating a circular mold.

As shown in FIG. 9, after the length of twisted dough 22 has been wound into mold 8c in the Dough Delivery Stage, the mold advances to the position of mold 8d where a pressing member 24 is lowered into the interior circular recess of mold 8d. Here the rotary motion of the mold has terminated since sprocket 26c no longer engages fixed chain 26d. The pressing member 24 is part of pressing assembly 10 shown in FIGS. 1 and 2. FIG. 12 shows mold 8d and the pressing assembly, designated generally by the numeral 10, in greater detail. The pressing member 24, is lowered into the circular recess of mold 8a to compress the dough ring 12 with the result that the ends of dough ring 12 are united together within the mold 8d. Such compression also has the result of embedding the topping material 18 into the bottom surface of the dough ring 12 as shown in mold 8d of FIG. 12. The dough ring 12 is later inverted with the result that the topping material 18 is on the top of the dough ring 12 when the dough ring 12 is discharged at a later stage from mold 8d.

Referring to FIGS. 2 and 12, pressing member 24 of pressing assembly 10 is operated by a carriage 42. As shown in FIGS. 2 and 12, the carriage 42 is mounted upon crossheads 44 which are slidably mounted on rods 54. In turn crossheads 44 are engaged by pins 44a which are adapted to slide vertically between guides 45a in extension 45b of uprights 45. Rods 54 are mounted at the opposite ends thereof in blocks 54a which are clamped to pushrods 54b. The pushrods are supported for vertical reciprocation by means of bearings 54c. The pushrods are reciprocated in response to the engagement of roller followers 47 which engage cam 49. Since the cams are driven in synchronism with that of the endless chains 4, the cams serve to reciprocate the pushrods 54b and thereby carriage 42 in synchronism with the advancement of molds 8 through the machine.

In operation it is intended that pressing member 24 enter the circular recess of mold 8 as the mold is advanced through the machine. In order to accomplish this, it is necessary that the carriage 42 be advanced in the direction of the movement of the molds whenever pressing member 24 is lowered into a given mold. Uprights 45 are slidably mounted by sleeves 53 upon rods 52 which are secured to the frame of the machine. Uprights 45 include vertically extending guides 45b which are in engagement with blocks 46. Blocks 46 are pivotally mounted with respect to endless chains 41 disposed at each of the opposite sides of the machine. The movement of blocks 46 along the path of travel of chain 41 causes the blocks to reciprocate vertically within guides 45b and at the same time to cause uprights 45 to move with a reciprocating motion in a lateral direction extending parallel to the path of travel of the molds.

Thus as a mold is advanced to beneath the pressing member the pressing member is lowered into the mold and into engagement with the dough ring disposed therein. As the mold advances, the pressing member remains in engagement with the dough ring until the end of the lower reaches of chain 41 is approached. At this point cams 49 elevate the carriage 42 and cause the pressing member to be elevated above the mold. Blocks 46 can then cause 45 to move in a direction opposite to the path of travel of the molds and to be returned to the starting position from which the pressing member can again be lowered into the succeeding mold.

DISCHARGE STAGE

Figure 13:
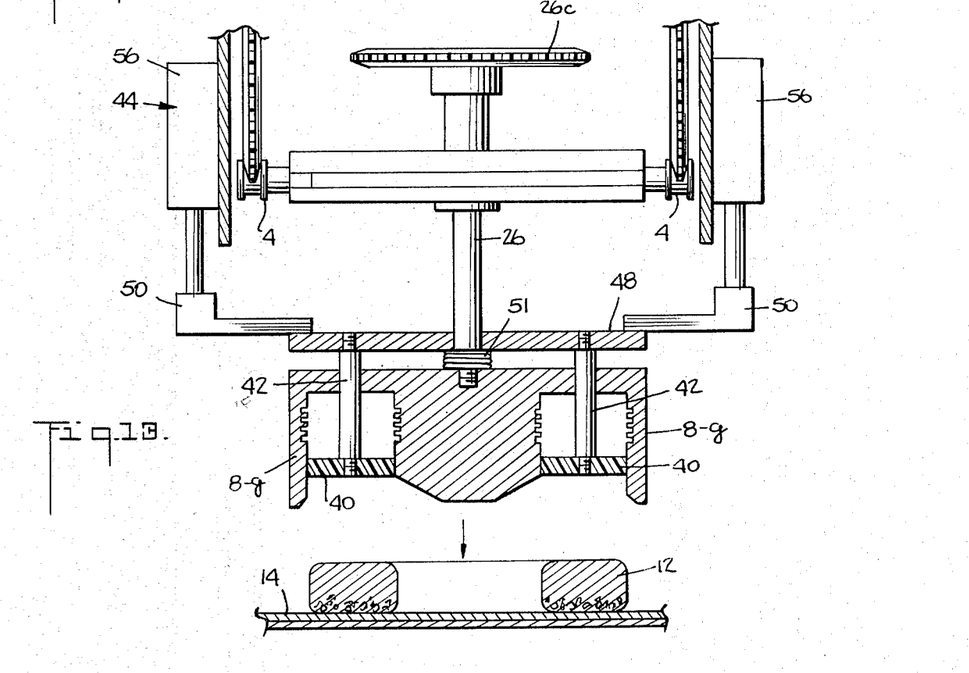
FIG. 13 is a vertical section view taken along the line 13—13 of FIG. 1 and showing a ring of dough being discharged from an inverted circular mold.

Referring to FIG. 9, when the mold 8 arrives at the position of mold 8g, the dough ring 12 is discharged from mold 8g and placed on baking tray 14 by the apparatus shown in FIG. 13. Referring to FIG. 13, the mold 8g is now in its inverted position, which allows dough ring 12 to fall downwardly from the circular recess of mold 8g onto baking tray 14. The ejection of dough ring 12 from mold 8g does not depend solely on gravity. The dough ring 12 is affirmatively pushed out of circular mold 8g by the operation of the discharge assembly designated by the numeral 44 in FIG. 13 upon the movable bottom plate 40.

Bottom plate 40 is a circular annular-shaped plate within the recess of mold 8g. Bottom plate 40 is movable with respect to mold 8g within the interior recess of mold 8g and is pushed downwardly by pins 42 connected to discharge plate 48. The discharge assembly designated generally by the numeral 44 in FIG. 13 delivers a hammer-like blow to the mold 8g which compresses biasing spring 51 as a result of the downward movement of discharge plate 48. The hammer-like blow is generated by air cylinders 56 and is transmitted by discharge arms 50, which are connected to air cylinders 56, to discharge plate 48. The air cylinders are actuated by valves which operate in a synchronized relation with respect to the drive of chains 4. Biasing spring 51 biases the bottom plate 40 away from the mold except for the interval shown in FIG. 13 when plate 40 is driven downwardly to its discharge position by the hammer-like blow. In this way the bottom plate 40 is biased against the bottom of the mold. In this embodiment the movable bottom plate 40 can be made of fluorocarbon resin material such as TEFLON resin material which inhibits the dough ring 12 from sticking to the plate and facilitates the ejection of the dough ring 12 from mold 8g.

Referring to FIG. 9, when the mold 8 is in its upright position, before inversion, such as in the position of mold 8b, 8c, 8d and e, movable plate 40 is at the bottom of the circular recess of mold 8 below the dough ring 12. This is more clearly shown in FIG. 12. A comparison of FIG. 12 with FIG. 13 reveals that movable plate 40 in its retracted position is at the bottom of mold 8d below dough ring 12; whereas in FIG. 13 mold 8g has been inverted and movable plate 40 in its discharge position with the dough ring 12 delivered onto tray 14.

As a given mold is advanced from position 8f to position 8g, there is a tendency for the dough ring 12 to begin to fall from the interior of the mold. In order to prevent premature release of the dough ring from the mold, there can be provided web 58 (FIGS. 1 and 9) which engages and covers the open portion of the mold as it is inverted and lowered. As a result the dough ring is caused to be fully released at position 8g. The web can be formed of sheet resin material which is impervious to the constituents of the dough and which presents a smooth, flexible and continuous surface to the mold and the dough ring.

What is claimed is:

1. A machine for making coffee rings from the lengths of twisted dough comprising:
   a. a plurality of molds each having an open cylindrical cavity;
   b. means connected to the molds for advancing the molds spaced apart from one another along a predetermined path of travel with the cavities therein facing in a substantially upward direction;
   c. means for rotating each of the advancing molds in a predetermined sense about an axis extending substantially in an upright direction;
   d. means for sequentially receiving each length of twisted dough in a position in which the length of twisted dough overlies and extends substantially along one side of the predetermined path of travel, the rotational movement of a mold adjacent to the one side being opposite to the direction of the advancing of the molds; and
   e. means for progressively guiding each of the lengths of twisted dough from the receiving means and into the open cylindrical cavity of a different one of the molds, the end portion of the lengths of twisted dough which is first adjacent to a mold being the initial portion of the length guided thereinto, the rotation of the advancing molds causing the guided lengths of twisted dough to be substantially wound within the circular cavities of the molds in the form of coffee rings.

2. A machine for making coffee rings in accordance with claim 1 in which the means connected to the molds for advancing the molds spaced apart from one another along a predetermined path of travel comprises an endless conveyor having upper and lower reaches, the cavities of the molds facing in a substantially upward direction along the upper reach of the conveyor.

3. A machine for making coffee rings in accordance with claim 1 in which the means for sequentially receiving each length of twisted dough comprises:
  i. a stationary baffle disposed above the molds with the cavities therein facing in a substantially upward direction and extending upwardly and substantially parallel to the predetermined path of travel; and
  ii. at least one movable baffle overlying the molds with the cavities therein facing in a substantially upward direction and extending laterally and in the direction of the predetermined path of travel and substantially parallel to the stationary baffle, the movable baffle being mounted for movement between a position adjacent to the stationary baffle and a position laterally displaced from the stationary baffle, the movable baffle being adapted to receive a length of twisted dough along the upper surface of the movable baffle in the adjacent position and to release the length of twisted dough in the displaced position.

4. A machine for making coffee rings in accordance with claim 3 in which the upper surface of the at least one movable baffle is concave along the length thereof.

5. A machine for making coffee rings in accordance with claim 3 in which the at least one movable baffle is inclined along its length with the lowest end portion thereof being the portion of the movable baffle adjacent to which a mold first advances.

6. A machine for making coffee rings in accordance with claim 1 in which there is a plurality of movable baffles disposed one above the other, end portions of the movable baffles adjacent to which a mold first advances being displaced with respect to one another with the uppermost movable baffle having its end portion being the initial end portion adjacent to which the mold advances, each of the plurality of movable baffles successively receiving a length of twisted dough beginning with the uppermost movable baffle.

7. A machine for making coffee rings in accordance with claim 1 in which the means for progressively guiding each of the lengths of twisted dough comprises means for actuating the receiving means to lower into the cylindrical cavity of a mold, the end portion of a length of twisted dough which is first adjacent to an advancing mold, then to lower the middle portion of the same length of twisted dough into the cavity, and then to lower the other end portion of the same length of twisted dough into the cavity.

8. A machine for making coffee rings in accordance with claim 3 in which the means for progressively guiding each length of twisted dough from the receiving means comprises means for moving the at least one movable baffle between the adjacent position and the displaced position in synchronism with the advancement of a mold adjacent thereto, the movement from the adjacent position to the displaced position being inverted as the mold approaches the baffle.

9. A machine for making coffee rings in accordance with claim 8 in which the means for moving the at least one movable baffle includes means for driving the moving means in response to the advancement of the molds.

10. A machine in accordance with claim 9 in which the means for driving the moving means in response to the advancement of the molds includes a follower in engagement with the moving means and the outer surface of the mold for transmitting a function of the motion of the advancement of a mold to the moving means.

11. A machine for making coffee rings in accordance with claim 1 in which there is a hub disposed substantially in the center of the cylindrical cavity of each of the molds, the hub forming an annular recess therein into which the lengths of twisted dough are guided for progressively guiding the lengths of twisted dough.

12. A machine for making coffee rings in accordance with claim 1 comprising means disposed adjacent to the means for sequentially receiving each length of twisted dough and overlying the path of travel of the molds for compressing the lengths of twisted dough when wound substantially within the cylindrical cavities of the molds to units the overlapped end portions thereof.

13. A machine for making coffee rings in accordance with claim 12 and further comprising means for reciprocating the means for compressing the lengths of twisted dough along a line of travel overlying and parallel to the path of travel of the molds to enable the compressing means to compress te lengths of twisted dough as the mold continues to be advanced.

14. A machine for making coffee rings in accordance with claim 1 and further comprising means for adding topping material to the cylindrical cavity of the molds prior to the guiding of the lengths of twisted dough thereinto.

15. A machine for making coffee rings in accordance with claim 1 and further comprising means for removing the coffee rings from the circular cavities of the molds.

16. A machine for making coffee rings in accordance with claim 15 in which the means for removing the coffee rings from the molds comprises means for at least partially inverting the molds.

17. A machine for making coffee rings in accordance with claim 15 in which the portion of the mold forming the bottom of the cylindrical cavity is movable with respect to the remainder of the cylindrical cavity and in which the means for removing the coffee rings from the molds includes means for moving the bottom of the cylindrical cavity to urge the coffee rings to be removed from the cylindrical cavity of the mold.

18. A machine for making coffee rings in accordance with claim 17 in which the means for moving the bottom of the cylindrical cavity applies impact to the bottom to facilitate removal of the coffee ring from the cavity.

* * * * *